United States Patent
Shin (10) Patent No.: US 12,497,017 B2
(45) Date of Patent: Dec. 16, 2025

(54) BRAKE CONTROL METHOD AND BRAKE DEVICE

(71) Applicant: HL MANDO CORPORATION, Gyeonggi-do (KR)

(72) Inventor: Jinseop Shin, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 143 days.

(21) Appl. No.: 18/375,522

(22) Filed: Oct. 1, 2023

(65) Prior Publication Data

US 2024/0116487 A1    Apr. 11, 2024

(30) Foreign Application Priority Data

Oct. 11, 2022    (KR) ......................... 10-2022-0129510

(51) Int. Cl.
*B60T 17/22*     (2006.01)
*B60T 13/74*     (2006.01)

(52) U.S. Cl.
CPC .......... *B60T 17/221* (2013.01); *B60T 13/741* (2013.01); *B60T 2270/406* (2013.01)

(58) Field of Classification Search
CPC ................. B60T 17/221; B60T 13/741; B60T 2270/406; B60T 8/17; B60T 2201/12; B60Y 2400/81
See application file for complete search history.

(56) References Cited

U.S. PATENT DOCUMENTS

2019/0154453 A1*   5/2019   Leone ................. B60W 30/188
2022/0048362 A1*   2/2022   Park .................... B60H 1/00978

* cited by examiner

*Primary Examiner* — Carl C Staubach
*Assistant Examiner* — Charles J Brauch
(74) *Attorney, Agent, or Firm* — WOMBLE BOND DICKINSON (US) LLP (57) ABSTRACT

The present disclosure relates to a brake control method and a brake device in which a brake pad wear compensation operation can be performed in a state in which a vehicle is being charged, comprising determining whether a vehicle is being charged; comparing a difference between a first travel distance of the vehicle at a time point of charging of the vehicle and a second travel distance of the vehicle at a time point when a brake pad wear compensation operation of the vehicle was most recently performed to a time point of charging of the vehicle with a preset threshold value, if it is determined that the vehicle is being charged; and determining whether to perform a brake pad wear compensation operation of the vehicle at the time point of the charging or after the time point of the charging, based on a result of the comparison.

16 Claims, 6 Drawing Sheets

BRAKE CONTROL METHOD AND BRAKE DEVICE

CROSS-REFERENCE TO RELATED APPLICATIONS

This application claims benefit and priority to Korean Patent Application No. 10-2022-0129510, filed on Oct. 11, 2022, with the Korean Intellectual Property Office, the disclosure of which is incorporated herein in its entirety by reference.

TECHNICAL FIELD

The present disclosure relates to a brake, and more particularly, to a brake control method and a brake device in which a brake pad wear compensation operation can be performed in a state in which a vehicle is being charged.

BACKGROUND

Since an electronic caliper brake performs a braking operation by pressing a pad plate having a friction pad on a disc rotating together with a wheel, wear of the friction pad inevitably occurs.

The larger the number of braking operations, the faster the friction pad wears out. Accordingly, when the friction pad is worn beyond an appropriate level, frictional force required for braking generated between the friction pad and the disc is not properly formed, resulting in a long braking distance.

In addition, there also occurs a problem that an operating time of a parking brake increases due to the wear of the friction pad.

For this reason, a friction pad wear compensation operation should be periodically performed. In the related art, the friction pad wear compensation operation is performed only when the engine of the vehicle is turned off.

SUMMARY

The present disclosure has been made in an effort to provide a brake control method and a brake device in which a brake pad wear compensation operation can be performed in a state in which a vehicle is being charged.

An exemplary embodiment of the present disclosure provides a brake control method including: determining whether a vehicle is being charged; comparing a travel distance of the vehicle from a time point when a brake pad wear compensation operation of the vehicle was most recently performed to a time point of charging of the vehicle with a preset threshold value, if it is determined that the vehicle is being charged; and determining whether to perform a brake pad wear compensation operation of the vehicle, based on a result of the comparison.

The comparing may include comparing a difference between a first travel distance, which is a total cumulative travel distance of the vehicle, and a second travel distance of the vehicle at the time point when the brake pad wear compensation operation of the vehicle was most recently performed with a threshold value.

As a result of the comparison, if the difference between the first travel distance and the second travel distance is greater than the threshold value, the brake pad wear compensation operation may be performed at the time point of the charging or after the time point of the charging, and as a result of the comparison, if the difference between the first travel distance and the second travel distance is less than or equal to the threshold value, the brake pad wear compensation operation may not be performed at the time point of the charging or after the time point of the charging.

The method may further include determining whether the start-up of the vehicle is terminated, before determining whether the vehicle is being charged.

If it is determined that the start-up of the vehicle is not terminated, determining whether the vehicle is being charged may be performed.

If it is determined that the start-up of the vehicle is terminated, after bypassing the determining as to whether the vehicle is being charged, comparing the difference between the first travel distance and the second travel distance with the threshold value may be performed.

The method may further include determining whether to perform the brake pad wear compensation operation at the time point of termination of the start-up or after the time point of termination of the start-up, based on a result of the comparison.

The method may further include determining whether the start-up of the vehicle is terminated, if it is determined that the vehicle is not being charged.

If it is determined that the start-up of the vehicle is terminated, comparing the difference between the first travel distance and the second travel distance with the threshold value may be performed.

The method may further include determining whether to perform the brake pad wear compensation operation at the time point of termination of the start-up or after the time point of termination of the start-up, based on a result of the comparison.

Another exemplary embodiment of the present disclosure provides a brake device including: a brake; and a brake controller for controlling the brake, in which the brake controller is configured to determine whether the vehicle is being charged, to compare a travel distance of the vehicle from a time point when a brake pad wear compensation operation of the vehicle was most recently performed to a time point of charging of the vehicle with a preset threshold value, if it is determined that the vehicle is being charged, and to determine whether to perform a brake pad wear compensation operation of the vehicle, based on a result of the comparison.

The brake controller may be configured to compare a difference between a first travel distance, which is a total cumulative travel distance of the vehicle, and a second travel distance of the vehicle at the time point when the brake pad wear compensation operation of the vehicle was most recently performed with a threshold value.

The brake controller may be configured to perform the brake pad wear compensation operation at the time point of the charging or after the time point of the charging, if the difference between the first travel distance and the second travel distance is greater than the threshold value, as a result of the comparison, and not to perform the brake pad wear compensation operation at the time point of the charging or after the time point of the charging, if the difference between the first travel distance and the second travel distance is less than or equal to the threshold value, as a result of the comparison.

The brake controller may be configured to further determine whether start-up of the vehicle is terminated, before determining whether the vehicle is being charged.

If it is determined that the start-up of the vehicle is not terminated, the brake controller may be configured to determine whether the vehicle is being charged.

If it is determined that the start-up of the vehicle is terminated, the brake controller may be configured to compare the difference between the first travel distance and the second travel distance with the threshold value, regardless of whether the vehicle is being charged.

The brake controller may be configured to further determine whether to perform the brake pad wear compensation operation at the time point of termination of the start-up or after the time point of termination of the start-up, based on a result of the comparison.

If it is determined that the vehicle is not being charged, the brake controller may be configured to further determine whether the start-up of the vehicle is terminated.

If it is determined that the start-up of the vehicle is terminated, the brake controller may be configured to compare the difference between the first travel distance and the second travel distance with the threshold value.

The brake controller may be configured to further determine whether to perform the brake pad wear compensation operation at the time point of termination of the start-up or after the time point of termination of the start-up, based on a result of the comparison.

According to the exemplary embodiments of the present disclosure, the brake pad wear compensation operation may be performed not only when the start-up of the vehicle is terminated but also when the vehicle is being charged even if the start-up of the vehicle is not terminated.

Therefore, since the brake pad wear compensation operation can be normally performed even for an electric vehicle that can be charged even in a state in which the start-up is not terminated, the stability and reliability of the electronic parking brake of the electric vehicle can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

The advantages and features of the present disclosure, and a method for achieving the same will become apparent with reference to exemplary embodiments described in detail later together with the accompanying drawings. However, the present disclosure is not limited to the exemplary embodiments disclosed below, but can be implemented in a variety of different forms. The exemplary embodiments are provided to only complete the present disclosure and to allow one skilled in the art to completely understand the category of the present disclosure. The present disclosure is only defined by the category of the claims. Thus, in some exemplary embodiments, well-known process steps, well-known device structures, and well-known technologies have not been specifically described in order to avoid obscuring the interpretation of the present disclosure. Like reference numbers designate like elements throughout the specification.

In the drawings, the thickness is shown enlarged to clearly express the various layers and regions. Like reference numerals have been assigned to like parts throughout the specification.

In the present specification, terms such as first, second, and third may be used to describe various components, but these components are not limited by the terms. The terms are used for the purpose of distinguishing one component from other components. For example, a first component may be termed a second or third component, etc., and similarly, a second or third component may also be termed interchangeably, without departing from the scope of the present disclosure.

Unless otherwise defined, all terms (including technical and scientific terms) used in the present specification may be used as the meaning that may be commonly understood by one skilled in the art to which the present disclosure belongs. In addition, terms defined in commonly used dictionaries should not be interpreted in an idealized or excessive sense unless defined explicitly and specially.

Hereinafter, a brake control method and a brake device according to exemplary embodiments of the present disclosure will be described in detail with reference to FIGS. 1 to 6.

Figure 1:
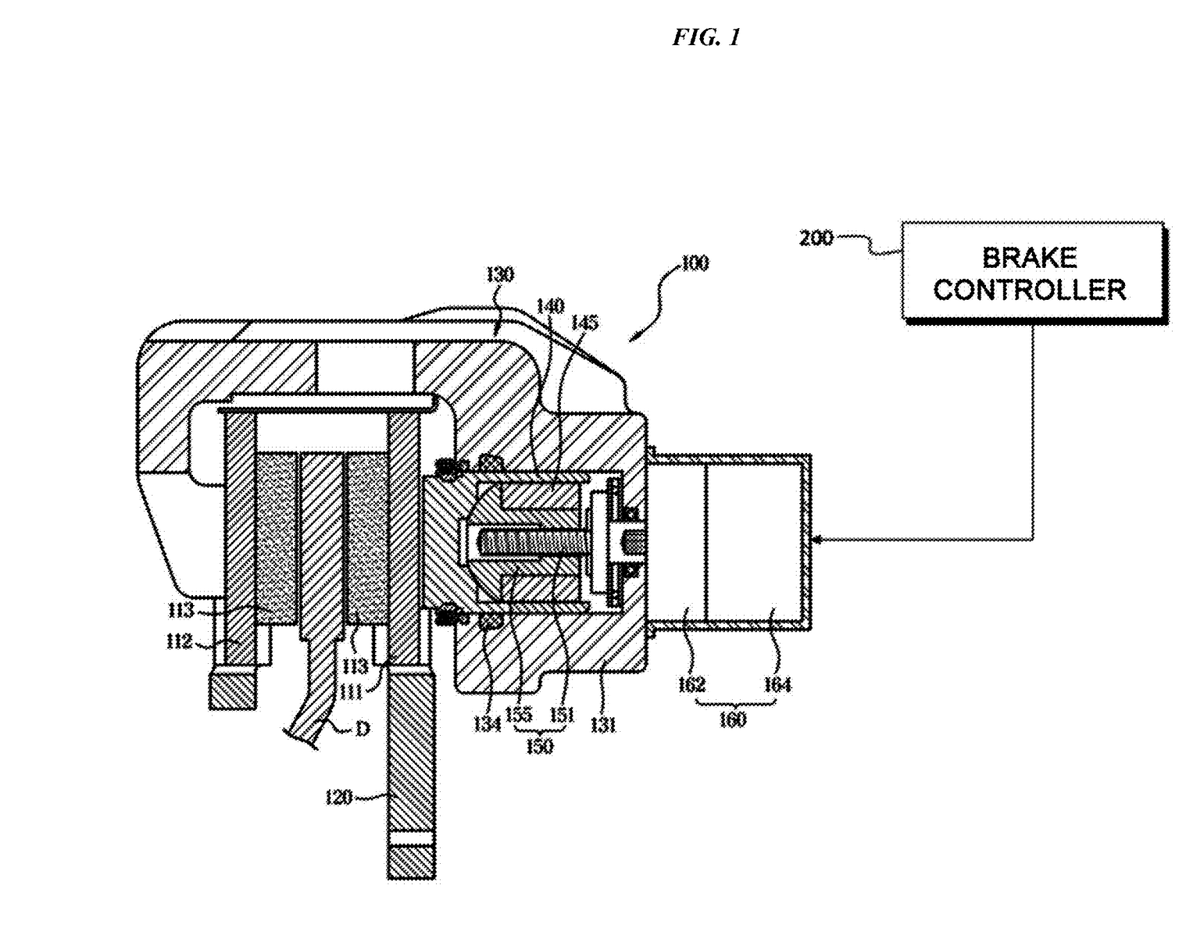
FIG. 1 is a schematic view of a brake device according to an exemplary embodiment of the present disclosure.

FIG. 1 is a schematic view of a brake device according to an exemplary embodiment of the present disclosure.

As shown in FIG. 1, a brake device according to an exemplary embodiment of the present disclosure may include a brake 100 and a brake controller 200 for controlling the brake 100.

Here, the brake 100 may include a carrier 120 on which a pair of pad plates 111 and 112 are installed to be able to advance and retract so as to press a disc D that rotates together with a wheel (or vehicle wheel) of a vehicle, a housing 130 slidably installed to the carrier 120 and having a cylinder 131 in which a piston 140 is installed to be able to advance and retract by braking hydraulic pressure, a power conversion unit 150 that pressurizes the piston 140, and an actuator 160 that transmits rotational force to the power conversion unit 150.

The pair of pad plates 111 and 112 may be installed on the carrier 120 fixed to a vehicle body so as to be able to advance and retract with respect to both sides of the disc D. In addition, a friction pad 113 may be attached to one surface of each of the pad plates 111 and 112 facing the disc D. The pair of pad plates 111 and 112 may be divided into an inner pad plate 111 arranged close to the piston 140 and an outer pad plate 112 arranged on an opposite side to the inner pad plate 111.

The housing 130 may be slidably installed to the carrier 120. The power conversion unit 150 is installed in the cylinder 131 of the housing 130, and the piston 140 may be built to be able to advance and retract.

The piston 140 is provided in a cylindrical shape having a cup-shaped inside and can be inserted to be slidable in the cylinder 131. In this case, at least one flat surface may be formed on an inner circumferential surface of the piston 140. The flat surface can be in contact with a nut member 155 of the power conversion unit 150 to limit rotation, thereby converting rotational motion into linear motion. The piston 140 presses the inner pad plate 111 toward the disc D by axial force of the power conversion unit 150 receiving the rotational force from the actuator 160, and the outer pad plate 112 is pressed toward the disc D by reaction force, whereby parking performance can be implemented.

A sealing member 134 prevents oil leakage between an outer surface of the piston 140 and an inner surface of the cylinder 131, and can serve to return the piston 140 to its original position when a braking action is released.

A filling member 145 may be arranged in the piston 140 while being coupled with a nut member 155. The filling member 145 fills an internal space of the piston 140, so that a required amount of brake oil introduced into the cylinder 131 is reduced, as compared with that in the related art, and therefore, pedal feel can be improved.

The power conversion unit 150 may receive rotational force from the actuator 160 including a motor 164 and a decelerator 162 to press the piston 140 toward the inner pad plate 111. The power conversion unit 150 may include a nut member 155 arranged in the piston 140 to pressurize the piston 140, and a spindle member 151 screwed with the nut member 155.

More specifically, one side of the spindle member 151 may be rotatably installed penetrating through the housing 130, for example, the cylinder 131, and the other side may be arranged in the piston 140. In this case, one side of the spindle member 151 penetrating through the cylinder 131 is connected to the decelerator 162 to receive rotational force of the motor 164, and a screw thread may be formed on an outer circumferential surface of the other side.

Such a brake 100 may provide a service brake (or foot brake) and an electric parking brake.

When the brake 100 operates as a service brake, the piston 140 advances toward the disc D by hydraulic pressure, and accordingly, the friction pad 113 comes into contact with the disc D, so that braking force can be generated. At this time, the nut member 155 does not move. In other words, when the service brake is operated, the piston 140 may move toward the disc D while the nut member 155 is fixed.

When the brake 100 operates as an electronic parking brake, drive force of the motor 164 provided in the power conversion unit 150 may move the nut member 155 toward an inner wall of the piston 140. When the vehicle is parked, the operation of the service brake may be performed first, and the operation of the electronic parking brake may be then performed in a state in which the service brake is maintained.

As the number of uses of the brake 100 increases, the friction pad 113 of the brake 100 gradually wears. As the friction pad 113 wears, a problem that a gap between the nut member 155 and the piston 140 gradually increases during the operation of the electronic parking brake may occur. The brake controller 200 can perform an operation for compensating for an amount of change in the gap between the nut member 155 and the piston 140 according to the wear of the friction pad 113. For example, when a thickness of the friction pad 113 is reduced due to the wear, the friction pad 113 and the disc D can be brought into contact with each other to generate braking force normally only when the piston 140 is further moved toward the disc D by the reduced thickness. Accordingly, during the operation of the service brake, the gap between the inner wall of the piston 140 and the nut member 155 increases, and during the operation of the parking brake, the nut member 155 moves a longer distance by a distance of the increased gap, resulting in an increase in actual parking operation time by the electronic parking brake. As such, when the parking time of the parking brake increases, a phenomenon that the vehicle is pushed back when parked on a ramp, for example, may occur.

In order to address this problem, an operation for compensating for an amount of change in the gap between the nut member 155 and the piston 140, for example, a brake pad wear compensation operation may be performed. As an example of such a brake pad wear compensation operation, when a preset condition is satisfied, the brake controller 200 may perform an apply operation of bringing the nut member 155 and the inner wall of the piston 140 into contact with each other by driving the power conversion unit 150 to move the nut member 155 toward the inner wall of the piston 140, and then may perform a release operation of spacing the nut member 155 and the inner wall of the piston 140 by a preset distance by moving the nut member 155 in a direction opposite to the moving direction during the apply operation. In this case, since the release operation is performed based on a time point when the apply operation has been performed, the gap between the nut member 155 and the piston 140 can be restored and maintained at a preset dimension by the brake pad wear compensation operation including the apply operation and the release operation. Therefore, the operating time of the electronic parking brake can always be maintained constant.

The brake pad wear compensation operation described above may be performed, for example, when the vehicle is being charged or when start-up of the vehicle is terminated. To this end, for example, the brake controller 200 may determine at least one of two things: whether the vehicle is being charged and whether start-up of the vehicle is terminated. As an example for this, the brake controller 200 may determine that the vehicle is not currently running when it receives at least one of a battery charging signal and a start-up termination signal from the outside, and perform the brake pad wear compensation operation (for example, the apply and releasing operations of the nut member 155). Here, the battery charging signal may be a signal indicating that charging of the vehicle has started, and the start-up termination signal may be a signal indicating that the start-up of the vehicle has been terminated (or turned off).

A battery of the vehicle may be charged by being connected to a charging device. Here, the charging device may include, for example, a charging stand installed in an electric vehicle charging station or a commercial power supply outlet in a general building into which a charging plug of a vehicle can be inserted. The commercial power supply outlet may be a general commercial power supply connection means provided at home, in a parking lot of a building, or the like. As an example, the commercial power supply outlet may be a 220V outlet arranged in a wall of a home or a commercial building.

The battery charging signal described above may be input to the brake controller 200 when the vehicle is connected to a charging device, for example. As a specific example, a vehicle may include a charging communication control device capable of communicating with a charging device. The battery charging signal described above may be generated and transmitted to the brake controller 200 at a time point when the vehicle is connected to the charging device and communication is initiated between the charging communication control device of the vehicle and the charging device.

The charging communication control device may communicate with the charging device in a power line communication (PLC) method according to, for example, an ISO 15118 protocol (i.e., an international communication standard for electric vehicle charging).

The battery charging signal may be provided from an electronic control device (e.g., a host electrical control unit (ECU)) connected to the charging communication control device described above. For example, when communication is initiated between the charging communication control device of the vehicle and the charging device, the charging communication control device may transmit a communication initiation signal to the electronic control device. In response to the communication initiation signal, the electronic control device may output a battery charging signal and transmit the same to the brake controller 200.

As another exemplary embodiment, the battery charging signal described above may be output from the charging communication control device and transmitted to the brake controller 200. In other words, when communication is initiated between the charging communication control device of the vehicle and the charging device, the charging communication control device may output a battery charging signal and transmit the same to the brake controller 200.

Meanwhile, the charging communication control device may be built in the electronic control device. In addition, the electronic control device described above may perform the function of the charging communication control device.

Further, as another exemplary embodiment, the battery charging signal described above may be generated at a time point when charging power is substantially supplied to the vehicle. For example, after the vehicle is connected to the charging device as described above and communication is normally performed between the charging communication control device of the vehicle and the charging device, when charging power starts to be supplied from the charging device to the vehicle (e.g., when the battery of the vehicle starts to be charged), a battery charging signal may be generated from the electronic control device and transmitted to the brake controller 200.

When it is determined that the vehicle is being charged, the brake controller 200 may compare a difference (hereinafter, referred to as a difference value) between first and second travel distances of the vehicle with a preset threshold value. For example, a battery charging signal may be output from the electronic control device and supplied to the brake controller 200 at a time point of charging of the vehicle. At this time, in response to the battery charging signal, the brake controller 200 may calculate a difference value between first and second travel distances of the vehicle, and compare the calculated difference value with a threshold value.

The first travel distance of the vehicle may be, for example, a travel distance of the vehicle at a time point of charging of the vehicle (e.g., a total cumulative travel distance of the vehicle up to the time point of charging of the vehicle). Here, as described above, the time point of charging of the vehicle may be a time point when communication is initiated between the charging communication control device of the vehicle and the charging device or a time point when charging power starts to be supplied from the charging device to the vehicle.

The second travel distance of the vehicle may be a travel distance (e.g., a total cumulative travel distance of the vehicle up to a time point when the brake pad wear compensation operation was most recently performed in the past) of the vehicle at a time point when the brake pad wear compensation operation of the vehicle was most recently performed (or a time point when the brake pad wear compensation operation of the vehicle was completed after the performance). The second travel distance may be a travel distance at a time point temporally earlier than the first travel distance. Therefore, the second travel distance may always have a value smaller than the first travel distance.

As another exemplary embodiment, when it is determined that the vehicle is being charged, the brake controller 200 may separately sense a travel distance (third travel distance) from a time point when a brake pad wear compensation operation was most recently performed to a time point of charging of the vehicle. For example, a travel distance counter (not shown) may sense the third travel distance. The travel distance counter may be reset at a time point when the brake pad wear compensation operation is performed, sense a travel distance thereafter, and provide the same to the brake controller 200, and the brake controller 200 may compare the third travel distance with a preset threshold value. The third travel distance may be equal to a difference value between the first travel distance and the second travel distance.

The brake controller 200 may determine whether to perform a brake pad wear compensation operation at the time point of charging (or after the time point of charging), based on a result of the comparison. In other words, based on a result of the comparison described above, the brake controller 200 may determine whether to perform a brake pad wear compensation operation at the time point of charging (or after the time point of charging). For example, as a result of the comparison, when it is confirmed that the difference value (first travel distance−second travel distance) or the third travel distance is greater than the threshold value, the brake controller 200 may perform a brake pad wear compensation operation at the time point of the charging (or after the time point of the charging). On the other hand, as a result of the comparison, when it is confirmed that the difference value (first travel distance−second travel distance) or the third travel distance is smaller than or equal to the threshold value, the brake controller 200 may not perform a brake pad wear compensation operation at the time point of the charging (or after the time point of the charging).

The brake controller 200 may perform the above-described brake pad wear compensation operation even when the start-up termination signal is input from the electronic control device. For example, the brake controller 200 may compare the difference value between the first travel distance and the second travel distance with the threshold value when it is determined that the start-up of the vehicle is terminated. For example, a start-up termination signal may be output from the electronic control device and supplied to the brake controller 200 at a time point when the start-up of the vehicle is terminated. At this time, in response to the start-up termination signal, the brake controller 200 may calculate the difference value between the first and second travel distances of the vehicle, and compare the calculated difference value with the threshold value. Here, the first travel distance may be a total cumulative travel distance of the vehicle up to the current time point (at the time point of termination of the start-up), and the second travel distance may be a total cumulative travel distance of the vehicle up to the time point when the brake pad wear compensation operation was most recently performed.

The brake controller 200 may determine whether to perform a brake pad wear compensation operation at the time point of termination of the start-up (or after the time point of termination of the start-up), based on a result of the comparison described above. In other words, based on a result of the comparison described above, the brake controller 200 may determine whether to perform a brake pad wear compensation operation at the time point of termination of the start-up (or after the time point of termination of the start-up). For example, as a result of the comparison, when it is confirmed that the difference value (first travel distance−second travel distance) is greater than the threshold value, the brake controller 200 may perform a brake pad wear compensation operation at the time point of termination of the start-up (or after the time point of termination of the start-up). On the other hand, as a result of the comparison, when it is confirmed that the difference value (first travel distance−second travel distance) is smaller than or equal to the threshold value, the brake controller 200 may not perform a brake pad wear compensation operation at the time point of termination of the start-up (or after the time point of termination of the start-up).

In this way, when the vehicle is being charged or when the start-up of the vehicle is terminated (or turned off), a brake pad wear compensation operation may be performed. In other words, when any one of a condition (hereinafter, referred to as a first condition) that the vehicle is being charged and a condition (hereinafter, referred to as a second condition) that the start-up of the vehicle is terminated is satisfied, the brake controller 200 may determine that the vehicle is currently in a non-driving state, and instruct the brake 100 to perform the brake pad wear compensation operation described above. Therefore, even when the start-up of the vehicle is in an on state, if the vehicle is being charged, the brake pad wear compensation operation described above may be performed. For example, when the electric vehicle is connected to a charging device and is being charged in a state in which the start-up is on, the brake pad wear compensation operation described above may be performed. In addition, even when the vehicle is in a non-charging state, if the start-up of the vehicle is in a termination state, the brake pad wear compensation operation described above may be performed.

The brake controller 200 may be built into, for example, the electronic control device described above. Additionally or alternatively, the electronic control device described above may further perform the function of the brake controller 200. Additionally or alternatively, the function of the brake controller 200 may be included as software in the electronic control device described above.

A brake device control method according to an exemplary embodiment of the present disclosure will be described in detail as follows.

Figure 2:
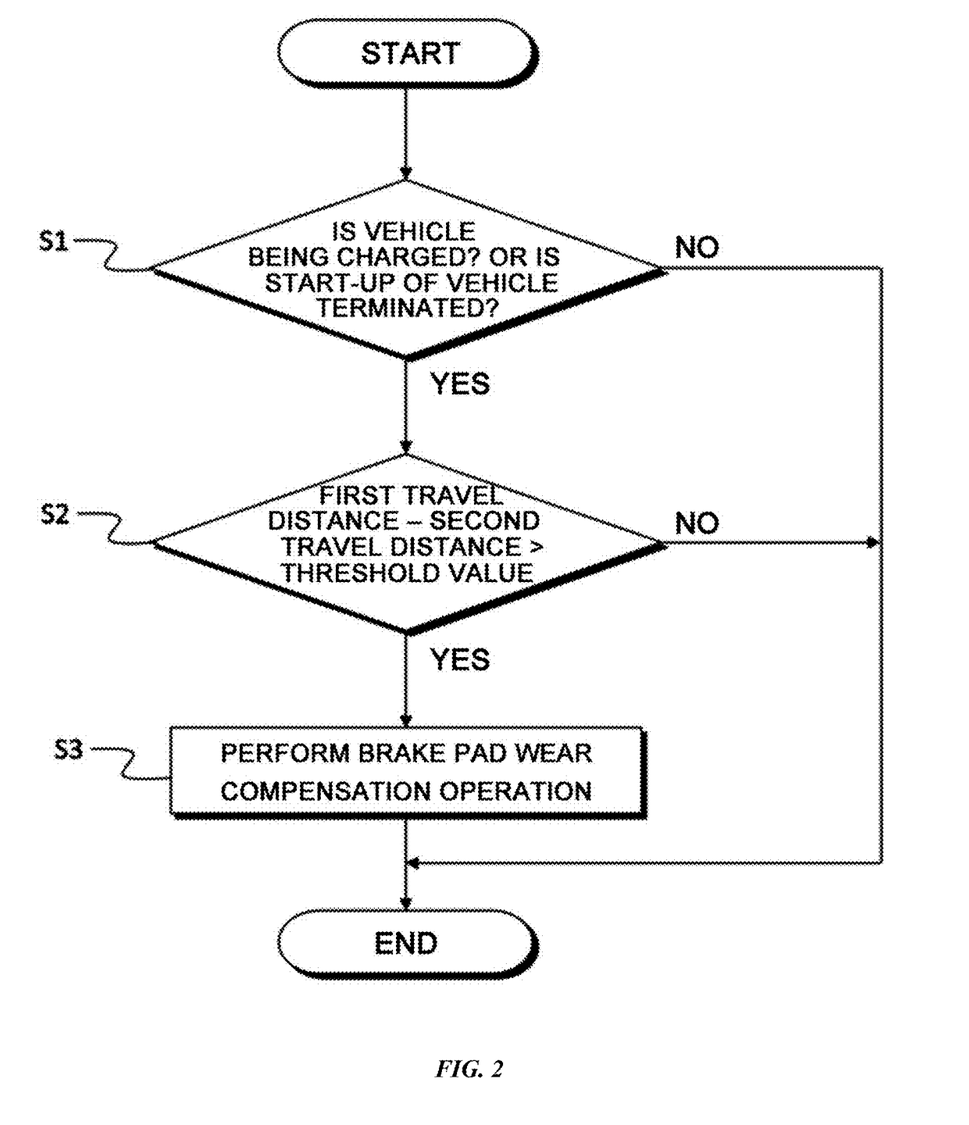
FIG. 2 is a flowchart for illustrating a brake control method according to an exemplary embodiment of the present disclosure.

FIG. 2 is a flowchart for illustrating a brake control method according to an exemplary embodiment of the present disclosure.

First, the brake controller 200 may determine at least one of two things: whether the vehicle is being charged and whether the start-up of the vehicle is terminated (S1). For example, the brake controller may determine whether any one of the first condition that the vehicle is being charged and the second condition that the start-up of the vehicle is terminated is satisfied.

As a result of the determination in step S1, when it is confirmed that at least one of the first condition and the second condition is satisfied, the brake controller 200 may compare a difference value between the first travel distance and the second travel distance of the vehicle with a threshold value (S2). On the other hand, when it is confirmed that neither the first condition nor the second condition is satisfied as a result of the determination in step S1 described above, the brake controller 200 may not perform a brake pad wear compensation operation. Here, as described above, the first travel distance of the vehicle is the total cumulative travel distance of the vehicle at a current time point (e.g., the total cumulative travel distance of the vehicle at the time point of the charging or the total cumulative travel distance of the vehicle at the time point of termination of the start-up), and the second travel distance of the vehicle may be the cumulative travel distance of the vehicle at the time point when the brake pad wear compensation operation of the vehicle was most recently performed. As another exemplary embodiment, the brake controller 200 may acquire a third travel distance, which is a difference value between the first travel distance and the second travel distance, from the travel distance counter (not shown), in step S2.

As a result of the comparison in step S2 described above, when it is confirmed that the difference value (first travel distance−second travel distance) or third travel distance is greater than the threshold value, the brake controller 200 may perform a brake pad wear compensation operation (e.g., the above-described apply operation and release operation of the nut member 155) at the time point of the charging (or after the time point of the charging) or at the time point of termination of the start-up (or after the time point of termination of the start-up) (S3). For example, the brake controller 200 may control the brake to perform the brake pad wear compensation operation. On the other hand, as a result of the comparison in step S2 described above, when it is confirmed that the difference value (first travel distance−second travel distance) or third travel distance is smaller than or equal to the threshold value, the brake controller 200 may not perform a brake pad wear compensation operation at the time point of the charging (or after the time point of the charging) or at the time point of termination of the start-up (or after the time point of termination of the start-up).

Figure 3:
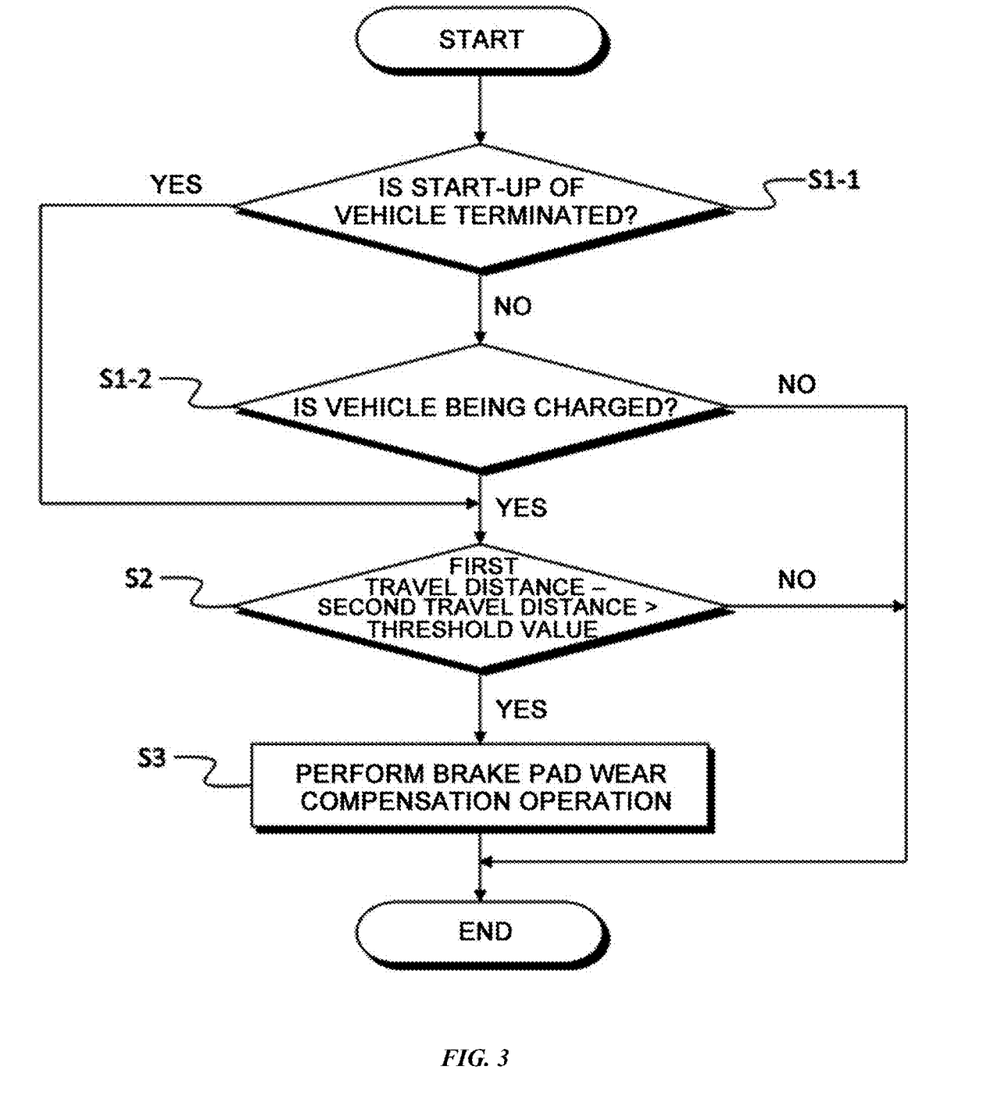
FIG. 3 is a flowchart for illustrating a brake control method according to another exemplary embodiment of the present disclosure.

FIG. 3 is a flowchart for illustrating a brake control method according to another exemplary embodiment of the present disclosure.

First, the brake controller 200 may determine whether the start-up of the vehicle is terminated (S1-1).

As a result of the determination in step S1-1, when it is confirmed that the start-up of the vehicle is terminated, the brake controller 200 compares the difference value between the first and second travel distances of the vehicle with the threshold value (S2), as described above, and based on a result of the comparison in step S2, the brake controller may determine whether to perform the brake pad wear compensation operation (e.g., the above-described apply operation and release operation of the nut member 155) (S3). In this way, when it is confirmed that the start-up of the vehicle is terminated, the brake controller 200 may directly perform the step S2 of comparing the difference value with the threshold value without checking whether the vehicle is being charged (S1-2). In other words, when the start-up of the vehicle is terminated, the brake controller 200 may bypass the step (S1-2) of checking whether the vehicle is being charged and immediately perform the step of comparing the difference value with the threshold value.

On the other hand, as a result of the determination in step S1-1 described above, when it is confirmed that the start-up of the vehicle is not terminated (for example, when it is confirmed that the start-up of the vehicle is on), the brake controller 200 may determine whether the vehicle is being charged (S1-2).

As a result of the determination in step S1-2, when it is confirmed that the vehicle is being charged, the brake controller 200 may compare the difference value between the first travel distance and the second travel distance of the vehicle with the threshold value (S2), as described above, and based on a result of the comparison, the brake controller may determine whether to perform the brake pad wear compensation operation (S3).

On the other hand, as a result of the determination in step S1-2, when it is confirmed that the vehicle is not being charged, the brake controller 200 may not perform the brake pad wear compensation operation.

Figure 4:
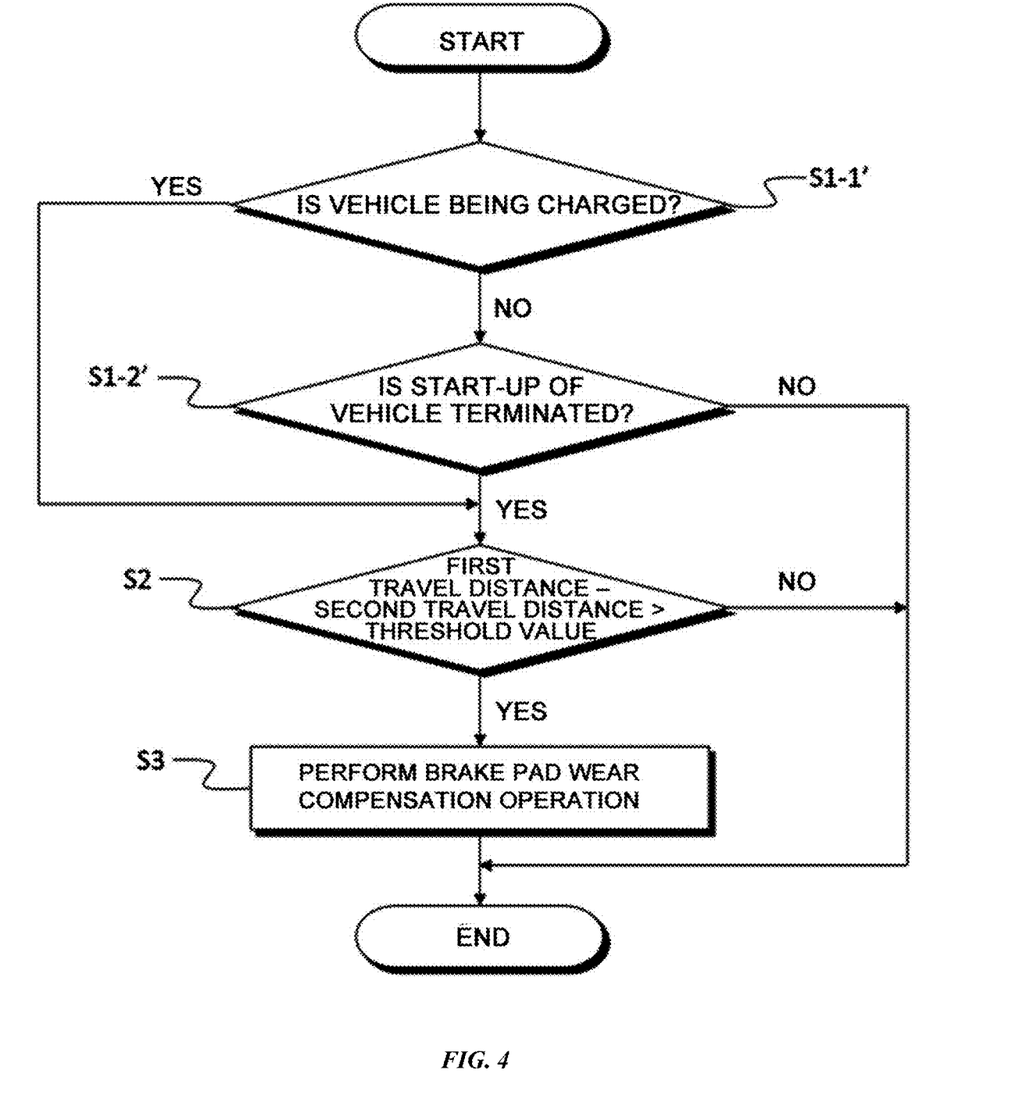
FIG. 4 is a flowchart for illustrating a brake control method according to still another exemplary embodiment of the present disclosure.

FIG. 4 is a flowchart for illustrating a brake control method according to still another exemplary embodiment of the present disclosure.

First, the brake controller 200 may determine whether the vehicle is being charged (S1-1').

As a result of the determination in step S1-1', when it is confirmed that the vehicle is being charged, the brake controller 200 may compare the difference value between the first travel distance and the second travel distance of the vehicle with the threshold value (S2), as described above, and based on a result of the comparison, the brake controller may determine whether to perform the brake pad wear compensation operation (e.g., the above-described apply operation and release operation of the nut member 155) (S3). In this way, when it is confirmed that the vehicle is being charged, the brake controller 200 may directly perform the step (S2) of comparing the difference value with the threshold value without checking whether the start-up of the vehicle is terminated (S1-2'). In other words, when the vehicle is being charged, the brake controller 200 may bypass the step (S1-2') of checking whether the start-up of the vehicle is terminated, and immediately perform the step (S2) of comparing the difference value with the threshold value.

On the other hand, as a result of the determination in step S1-1' described above, when it is confirmed that the vehicle is in a non-charging state (for example, when it is confirmed that the vehicle is not being charged), the brake controller 200 may determine whether the start-up of the vehicle is terminated (S1-2').

As a result of the determination in step S1-2', when it is confirmed that the start-up of the vehicle is terminated, the brake controller 200 may compare the difference value between the first travel distance and the second travel distance of the vehicle with the threshold value (S2), as described above, and based on a result of the comparison, the brake controller may determine whether to perform the brake pad wear compensation operation (S3).

On the other hand, as a result of the determination in step S1-2', when it is confirmed that the start-up of the vehicle is not terminated (for example, when it is confirmed that the start-up of the vehicle is on), the brake controller 200 may not perform the brake pad wear compensation operation.

Figure 5:
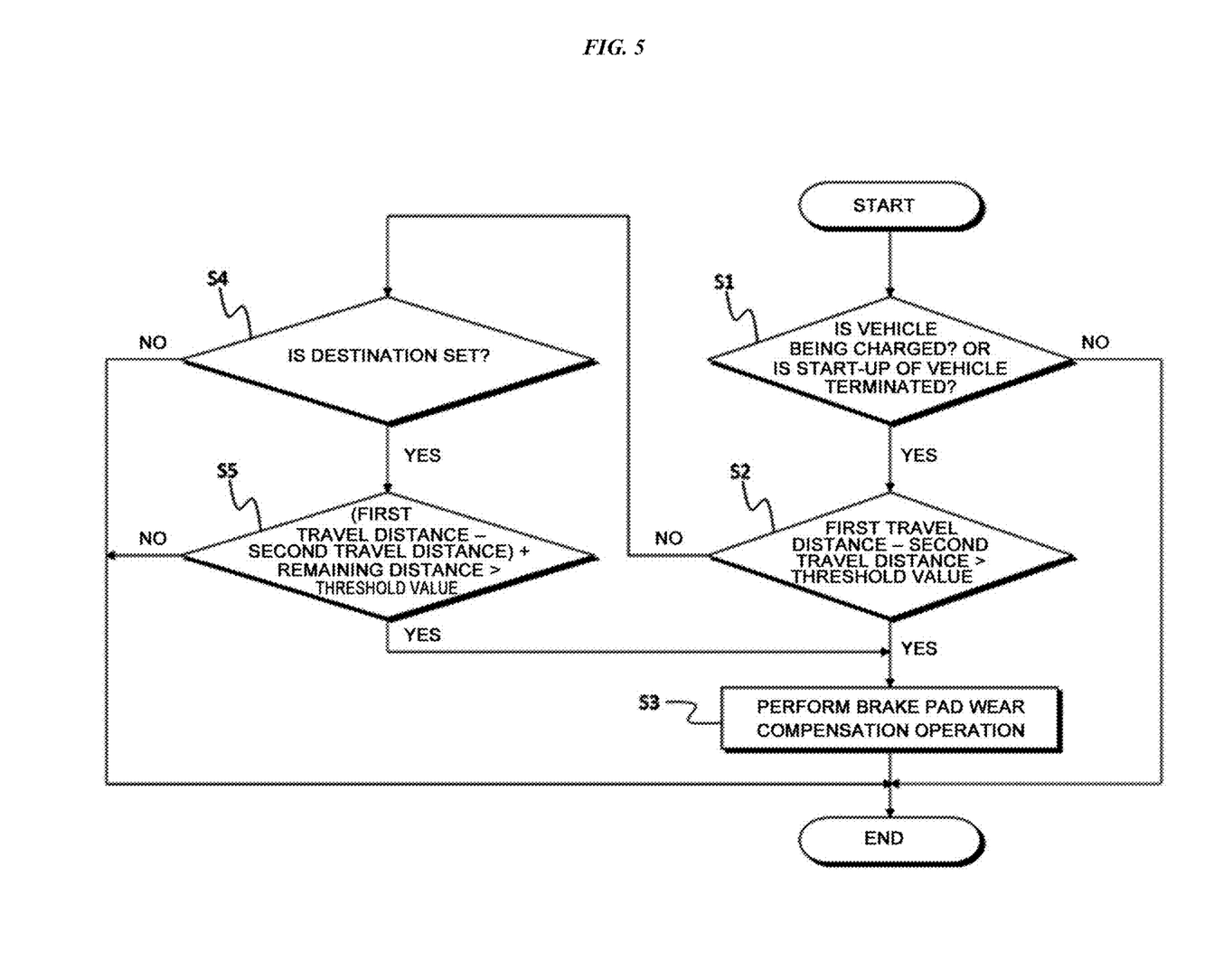
FIG. 5 is a flowchart for illustrating a brake control method according to yet still another exemplary embodiment of the present disclosure.

FIG. 5 is a flowchart for illustrating a brake control method according to yet still another exemplary embodiment of the present disclosure.

First, the brake controller 200 may determine at least one of two things: whether the vehicle is being charged and whether the start-up of the vehicle is terminated (S1). For example, the brake controller may determine whether any one of the first condition that the vehicle is being charged and the second condition that the start-up of the vehicle is terminated is satisfied.

As a result of the determination in step S1, when it is confirmed that at least one of the first condition and the second condition is satisfied, the brake controller 200 may compare a difference value between the first travel distance and the second travel distance of the vehicle with a threshold value (S2). On the other hand, when it is confirmed that neither the first condition nor the second condition is satisfied as a result of the determination in step S1 described above, the brake controller 200 may not perform a brake pad wear compensation operation. Here, as described above, the first travel distance of the vehicle may be a travel distance of the vehicle at a time point of charging of the vehicle, and the second travel distance of the vehicle may be a travel distance of the vehicle at a time point when a brake pad wear compensation operation of the vehicle (e.g., the above-described apply and release operations of the nut member 155) was most recently performed.

As a result of the comparison in step S2 described above, when it is confirmed that the difference value (first travel distance−second travel distance) is greater than the threshold value, the brake controller 200 may perform a brake pad wear compensation operation (e.g., the above-described apply operation and release operation of the nut member 155) at the time point of the charging (or after the time point of the charging) or at the time point of termination of the start-up (or after the time point of termination of the start-up) (S3). For example, the brake controller 200 may control the brake 100 to perform the brake pad wear compensation operation.

On the other hand, as a result of the comparison in step S2, when it is confirmed that the difference value (first travel distance−second travel distance) is smaller than or equal to the threshold value, the brake controller 200 may further determine whether a destination of the vehicle is set through an automotive navigation system or a car navigation system of the vehicle (S4). To this end, as an example, the brake controller 200 may receive information about a destination of the vehicle, a moving route, and a distance (e.g., remaining distance) of a moving route from a current vehicle position to the destination from the automotive navigation system. Here, the automotive navigation system may include, for example, a global navigation satellite system (GNNS), an inertial navigation system, and the like.

As a result of the determination in step S4 described above, when it is confirmed that the destination of the vehicle is set, the brake controller 200 may determine whether a sum (hereinafter, the sum value) of the difference value and a remaining distance exceeds the threshold value described above (S5). Here, the remaining distance may be, for example, a distance from a place where the vehicle is currently stopped to a destination. Meanwhile, the place where the vehicle is stopped may be, for example, a location of the vehicle at the time point when the start-up of the vehicle is terminated or a location of the vehicle at a charging facility where the vehicle is stopped for charging.

As a result of the determination in step S5, when it is confirmed that the sum value ((first travel distance−second travel distance)+remaining distance)) is greater than the threshold value, the brake controller 200 may perform a brake pad wear compensation operation at the time point of the charging (or after the time point of the charging) or at the time point of termination of the start-up (or after the time point of termination of the start-up) (S3). For example, the brake controller 200 may control the brake 100 to perform the brake pad wear compensation operation.

On the other hand, as a result of the determination in step S4 described above, when it is confirmed that the destination is not set, the brake controller 200 may not perform a brake pad wear compensation operation. In addition, as a result of the determination in step S5 described above, when it is confirmed that the sum value ((first travel distance−second travel distance)+remaining distance)) is smaller than or equal to the threshold value, the brake controller 200 may not perform a brake pad wear compensation operation.

Meanwhile, step S1 in FIG. 5 may include, for example, steps S1-1 and S1-2 of FIG. 3, or alternatively, steps S1-1' and S1-2' of FIG. 4.

According to the exemplary embodiment of FIG. 5, even if the difference value is smaller than or equal to the threshold value, when the remaining distance to the destination of the vehicle is sufficiently long, a brake pad wear compensation operation is performed, so that higher stability of the brake 100 can be secured.

Figure 6:
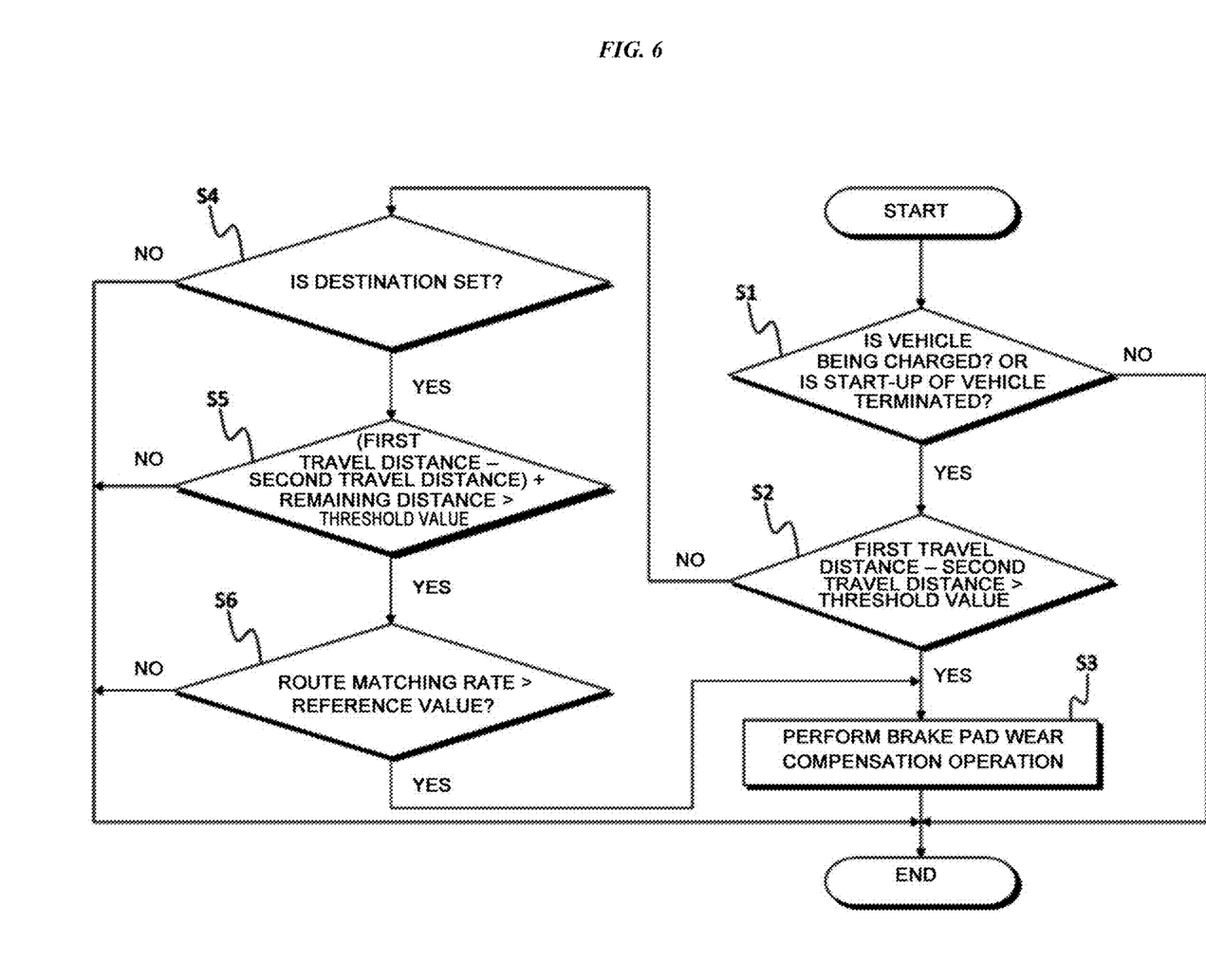
FIG. 6 is a flowchart for illustrating a brake control method according to further yet still another exemplary embodiment of the present disclosure.

FIG. 6 is a flowchart for illustrating a brake control method according to further yet still another exemplary embodiment of the present disclosure.

First, the brake controller 200 may determine at least one of two things: whether the vehicle is being charged and whether the start-up of the vehicle is terminated (S1). For example, the brake controller may determine whether any one of the first condition that the vehicle is being charged and the second condition that the start-up of the vehicle is terminated is satisfied.

As a result of the determination in step S1, when it is confirmed that at least one of the first condition and the second condition is satisfied, the brake controller 200 may compare a difference value between the first travel distance and the second travel distance of the vehicle with a threshold value (S2). On the other hand, when it is confirmed that neither the first condition nor the second condition is satisfied as a result of the determination in step S1 described above, the brake controller 200 may not perform a brake pad wear compensation operation. Here, as described above, the first travel distance of the vehicle may be a travel distance of the vehicle at a time point of charging of the vehicle, and the second travel distance of the vehicle may be a travel distance of the vehicle at a time point when a brake pad wear compensation operation of the vehicle (e.g., the above-described apply and release operations of the nut member 155) was most recently performed.

As a result of the comparison in step S2 described above, when it is confirmed that the difference value (first travel distance−second travel distance) is greater than the threshold value, the brake controller 200 may perform a brake pad wear compensation operation (e.g., the above-described apply operation and release operation of the nut member 155) at the time point of the charging (or after the time point of the charging) or at the time point of termination of the start-up (or after the time point of termination of the start-up) (S3). For example, the brake controller 200 may control the brake 100 to perform the brake pad wear compensation operation.

On the other hand, as a result of the comparison in step S2, when it is confirmed that the difference value (first travel distance−second travel distance) is smaller than or equal to the threshold value, the brake controller 200 may further determine whether a destination of the vehicle is set through an automotive navigation system or a car navigation system of the vehicle (S4). To this end, as an example, the brake controller 200 may receive information about a destination of the vehicle, a moving route, and a distance (e.g., remaining distance) of a moving route from a current vehicle position to the destination from the automotive navigation system.

As a result of the determination in step S4 described above, when it is confirmed that the destination of the vehicle is set, the brake controller 200 may determine whether a sum (hereinafter, the sum value) of the difference value and a remaining distance exceeds the threshold value described above (S5).

As a result of the determination in step S5, when it is confirmed that the sum value ((first travel distance−second travel distance)+remaining distance)) is greater than the threshold value, the brake controller 200 may calculate a matching rate (hereinafter, referred to as a route matching rate) between a suggested moving route presented by the automotive navigation system and an actual moving route of the vehicle, and compare the calculated matching rate with a preset reference value (S6). Here, the suggested moving route and the actual moving route may be, for example, routes between an initial starting point of the current vehicle and the current location of the vehicle (e.g., the current location of the stopped vehicle). Meanwhile, the reference value may be, for example, 70% to 90%. As another example, the reference value may be 80% to 90%. As still another example, the reference value may be 95%.

As a result of the comparison in step S6, when it is confirmed that the route matching rate is greater than the reference value, the brake controller 200 may perform a brake pad wear compensation operation at the time point of the charging (or after the time point of the charging) or at the time point of termination of the start-up (or after the time point of termination of the start-up) (S3). For example, the brake controller 200 may control the brake 100 to perform the brake pad wear compensation operation.

On the other hand, as a result of the determination in step S4 described above, when it is confirmed that the destination is not set, the brake controller 200 may not perform a brake pad wear compensation operation. In addition, as a result of the determination in step S5 described above, when it is confirmed that the sum value ((first travel distance−second travel distance)+remaining distance)) is smaller than or equal to the threshold value, the brake controller 200 may not perform a brake pad wear compensation operation. In addition, as a result of the determination in step S6 described above, when it is confirmed that the route matching rate is less than or equal to the reference value, the brake controller 200 may not perform a brake pad wear compensation operation.

Meanwhile, the step S6 of determining the route matching rate may be performed, for example, between the step S2 of comparing the difference value with the threshold value and the step S4 of determining whether a destination is set. Alternatively, the step S6 of determining the route matching rate may be performed, for example, between the step S4 of determining whether a destination is set and the step S5 of comparing the sum value with the threshold value.

Meanwhile, step S1 in FIG. 6 may include, for example, steps S1-1 and S1-2 of FIG. 3, or alternatively, steps S1-1' and S1-2' of FIG. 4.

According to the exemplary embodiment of FIG. 6, it is possible to more accurately determine whether to perform the brake pad wear compensation operation even when the remaining distance is sufficient by further determining the route matching rate to predict a moving possibility of the vehicle to the destination in the future.

Meanwhile, it will be understood that each block of the flowchart illustrations, and combinations of blocks in the flowchart illustrations, can be implemented by computer program instructions. Since these computer program instructions can be provided to a processor of a general purpose computer, special purpose computer, or other programmable data processing apparatus, the instructions, which execute via the processor of the computer or other programmable data processing apparatus, create means for implementing the functions specified in the flowchart block(s). Since these computer program instructions may also be stored in a computer usable or computer-readable memory that can direct a computer or other programmable data processing apparatus to implement functions in a particular manner, the instructions stored in the computer usable or computer-readable memory can produce an article of manufacture including instruction means that implement the functions specified in the flowchart block(s). Since the computer program instructions may also be loaded onto a computer or other programmable data processing apparatus, a series of operational steps are performed on the computer or other programmable data processing apparatus to produce a computer implemented process, such that the instructions, which execute on the computer or other programmable data processing apparatus, can provide steps for implementing the functions specified in the flowchart block(s).

Each block may represent a module, segment, or portion of code, which includes one or more executable instructions for implementing the specified logical function(s). It should also be noted that in some alternative implementations, the functions described in the blocks may occur out of the order. For example, two blocks shown in succession may in fact be executed substantially concurrently or the blocks may sometimes be executed in the reverse order, depending upon the functions thereof.

As used herein, the "unit" refers to a software element or a hardware element, such as a Field Programmable Gate Array (FPGA) or an Application Specific Integrated Circuit (ASIC), which performs a predetermined function. However, the 'unit' does not always have a meaning limited to software or hardware. The 'unit' may be configured to be located on an addressable storage medium, or to reproduce one or more processors. Therefore, the 'unit' includes, for example, components such as software components, object-oriented software components, class components, and task components, processes, functions, attributes, procedures, sub-routines, segments of a program code, drivers, firmware, micro-codes, circuits, data, databases, data structures, tables, arrays, and parameters. Components and functions provided in the 'units' may be combined into a smaller number of components and 'units', or may be further divided into additional components and 'units'. Moreover, components and 'units' may be implemented to reproduce one or more CPUs in a device or a security multimedia card.

One skilled in the art to which the present disclosure belongs can understand that the present disclosure can be implemented in other specific forms without changing the technical spirit or essential features thereof. Therefore, the exemplary embodiments described above should be understood as illustrative in all respects and not for purposes of limitation. The scope of the present disclosure is defined by the appended claims to be described later, rather than the detailed description. Accordingly, it should be appreciated that all modifications or variations derived from the meaning and scope of the appended claims and their equivalents are included in the range of the present disclosure.

Although the preferred embodiments of the present disclosure have been disclosed herein and in the drawings and specific terms are used, they are only used in a generic and descriptive sense for easily explaining the technical content of the present disclosure and helping the understanding of the present disclosure, not for purpose of limiting the scope of the present disclosure. In addition to the exemplary embodiments disclosed herein, it is obvious to one skilled in the art that other modified embodiments based on the technical spirit of the present disclosure can be implemented.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A brake control method comprising:
   determining whether a vehicle is being charged;
   comparing a travel distance of the vehicle from a time point when a brake pad wear compensation operation of the vehicle was most recently performed to a time point of charging of the vehicle with a preset threshold value, if it is determined that the vehicle is being charged;
   determining whether to perform a brake pad wear compensation operation of the vehicle, based on a result of the comparison; and
   determining whether a start-up of the vehicle is terminated, before determining whether the vehicle is being charged,
   wherein if it is determined that the start-up of the vehicle is terminated, after bypassing the determining as to whether the vehicle is being charged, comparing the difference between the first travel distance and the second travel distance with the threshold value is performed.

2. The brake control method of claim 1, wherein the comparing comprises comparing a difference between a first travel distance, which is a total cumulative travel distance of the vehicle, and a second travel distance of the vehicle at the time point when the brake pad wear compensation operation of the vehicle was most recently performed with a threshold value.

3. The brake control method of claim 2, wherein, as a result of the comparison, if the difference between the first travel distance and the second travel distance is greater than the threshold value, the brake pad wear compensation operation is performed at the time point of the charging or after the time point of the charging, and
   wherein, as a result of the comparison, if the difference between the first travel distance and the second travel distance is less than or equal to the threshold value, the brake pad wear compensation operation is no performed at the time point of the charging or after the time point of the charging.

4. The brake control method of claim 1, wherein if it is determined that the start-up of the vehicle is not terminated, determining whether the vehicle is being charged is performed.

5. The brake control method of claim 1, further comprising determining whether to perform the brake pad wear compensation operation at the time point of termination of the start-up or after the time point of termination of the start-up, based on a result of the comparison.

6. A brake control method comprising:
determining whether a vehicle is being charged;
comparing a travel distance of the vehicle from a time point when a brake pad wear compensation operation of the vehicle was most recently performed to a time point of charging of the vehicle with a preset threshold value, if it is determined that the vehicle is being charged;
determining whether to perform a brake pad wear compensation operation of the vehicle, based on a result of the comparison; and
determining whether a start-up of the vehicle is terminated, if it is determined that the vehicle is not being charged,
wherein if it is determined that the start-up of the vehicle is terminated, comparing the difference between the first travel distance and the second travel distance with the threshold value is performed.

7. The brake control method of claim 6, wherein the comparing comprises comparing a difference between a first travel distance, which is a total cumulative travel distance of the vehicle, and a second travel distance of the vehicle at the time point when the brake pad wear compensation operation of the vehicle was most recently performed with a threshold value.

8. The brake control method of claim 7, further comprising determining whether to perform the brake pad wear compensation operation at the time point of termination of the start-up or after the time point of termination of the start-up, based on a result of the comparison.

9. A brake device comprising:
a brake; and
a brake controller for controlling the brake,
wherein the brake controller is configured:
to determine whether a vehicle is being charged,
to compare a travel distance of the vehicle from a time point when a brake pad wear compensation operation of the vehicle was most recently performed to a time point of charging of the vehicle with a preset threshold value, if it is determined that the vehicle is being charged,
to determine whether to perform a brake pad wear compensation operation of the vehicle, based on a result of the comparison, and
to determine whether start-up of the vehicle is terminated, before determining whether the vehicle is being charged,
wherein the brake controller is configured to compare the difference between the first travel distance and the second travel distance with the threshold value, regardless of whether the vehicle is being charged, if it is determined that the start-up of the vehicle is terminated.

10. The brake device of claim 9, wherein the brake controller is configured to compare a difference between a first travel distance, which is a total cumulative travel distance of the vehicle, and a second travel distance of the vehicle at the time point when the brake pad wear compensation operation of the vehicle was most recently performed with a threshold value.

11. The brake device of claim 10, wherein the brake controller is configured:
to perform the brake pad wear compensation operation at the time point of the charging or after the time point of the charging, if the difference between the first travel distance and the second travel distance is greater than the threshold value, as a result of the comparison, and
not to perform the brake pad wear compensation operation at the time point of the charging or after the time point of the charging, if the difference between the first travel distance and the second travel distance is less than or equal to the threshold value, as a result of the comparison.

12. The brake device of claim 9, wherein the brake controller is configured to determine whether the vehicle is being charged, if it is determined that the start-up of the vehicle is not terminated.

13. The brake device of claim 9, wherein the brake controller is configured to further determine whether to perform the brake pad wear compensation operation at the time point of termination of the start-up or after the time point of termination of the start-up, based on a result of the comparison.

14. A brake device comprising:
a brake; and
a brake controller for controlling the brake,
wherein the brake controller is configured:
to determine whether the vehicle is being charged,
to compare a travel distance of the vehicle from a time point when a brake pad wear compensation operation of the vehicle was most recently performed to a time point of charging of the vehicle with a preset threshold value, if it is determined that the vehicle is being charged,
to determine whether to perform a brake pad wear compensation operation of the vehicle, based on a result of the comparison, and
determine whether a start-up of the vehicle is terminated, if it is determined that the vehicle is not being charged,
wherein the brake controller is configured to compare the difference between the first travel distance and the second travel distance with the threshold value, if it is determined that the start-up of the vehicle is terminated.

15. The brake device of claim 14, wherein the comparing comprises comparing a difference between a first travel distance, which is a total cumulative travel distance of the vehicle, and a second travel distance of the vehicle at the time point when the brake pad wear compensation operation of the vehicle was most recently performed with a threshold value.

16. The brake device of claim 15, wherein the brake controller is configured to further determine whether to perform the brake pad wear compensation operation at the time point of termination of the start-up or after the time point of termination of the start-up, based on a result of the comparison.

* * * * *